Dec. 15, 1964     R. C. PEABODY ETAL     3,160,908
POWER SWEEPER AIR FILTER AND DUST COLLECTOR SYSTEM
Filed Sept. 13, 1961     6 Sheets-Sheet 2

INVENTOR.
RALPH C. PEABODY
BY KEITH N. KRIER
Klugger & Johnson
ATTORNEYS Dec. 15, 1964 R. C. PEABODY ETAL 3,160,908
POWER SWEEPER AIR FILTER AND DUST COLLECTOR SYSTEM
Filed Sept. 13, 1961 6 Sheets-Sheet 6

INVENTOR.
RALPH C. PEABODY
BY KEITH N. KRIER

Wugger & Johnson
ATTORNEYS

United States Patent Office 3,160,908
Patented Dec. 15, 1964

---

3,160,908
POWER SWEEPER AIR FILTER AND DUST COLLECTOR SYSTEM
Ralph C. Peabody and Keith N. Krier, both of Minneapolis, Minn., assignors to The G. H. Tennant Company, Minneapolis, Minn., a corporation of Minnesota
Filed Sept. 13, 1961, Ser. No. 137,864
5 Claims. (Cl. 15—340)

This invention relates to power sweepers in which the sweeping element is enclosed in a sweeping compartment wherein a negative pressure is maintained by a suitable blower system, for controlling the dust which is raised by the sweeping element. In such devices, a large amount of air is drawn into the sweeping enclosure due to necessary clearances under the edges of the enclosure where it meets the surface being swept. The kind and fineness of the dust depends upon the conditions of the surface over which the machine is moved. There is, of course, always a considerable variation in dust particle sizes ranging from particles of very small size on up to particles which can hardly be called dust and are dirt and debris. The dust should not be liberated to the surrounding atmosphere and therefore in machines of this kind, various types of air-solid separators have been heretofore provided for separating the solid particles from the air-flow, and returning the solids (dust) to a collecting bin or hopper for eventual disposal.

The problem of capturing and holding the dust particles is aggravated by the fact that very large quantities of air must be handled, and because, in many cases, the size of the dust particles is very fine, i.e. to 0.5 micron and smaller. In addition, the sweeping machine as a whole must be capable of handling all sorts of debris, including sand, grit, dirt, litter, leaves, paper, etc. Such larger debris has frequently interfered with the operation of the devices heretofore provided for separating the dust.

It is an object of the present invention to provide an improved power sweeper, air filter and dust collector system which is capable of capturing dust particles ranging from very small to larger particles, and of returning them conveniently, and without operator attention, to a collecting hopper, for ultimate disposal.

It is another object of the invention to provide an improved power sweeping machine wherein a filter capacity of very large size may be provided within a small volumetric space. It is a further object of the invention to provide an improved power sweeper machine wherein the filter surfaces are cleaned automatically, due to the operation of the machine, and kept in a condition of improved efficiency in respect to filtering operations.

Another object of the invention is to provide an improved power sweeping machine having an air filtering arrangement thereon, wherein the power sweeper is self-cleaning, and is capable of discharging from itself not only the dust particles but also any extraneous larger debris which may be lodged therein.

It is a further object of the invention to provide a power sweeper machine wherein dust is controlled by air inflow into the power sweeping compartment and the air inflow of specified amount is provided, for controlling the dust raised during sweeping. It is also an object of the invention to provide an improved power sweeping machine of the vacuumized type, wherein dust raised during the sweeping is contained within a sweeping container, and the dust thereupon separated by a self-cleaning filter of improved large capacity. It is another object of the invention to provide an improved power sweeping machine and dust filter arrangement wherein the filtering capacity can conveniently be varied without changing the overall design of the machine, for increasing or decreasing the filtering capacity as needed. It is another object of the invention to provide in a power sweeping machine a dust filtering arrangement which is cleaned due to motion of the vehicle.

Other and further objects are those inherent in the specification and claims and will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein.

Throughout the drawings, corresponding numerals refer to the same parts.

Figure 1:
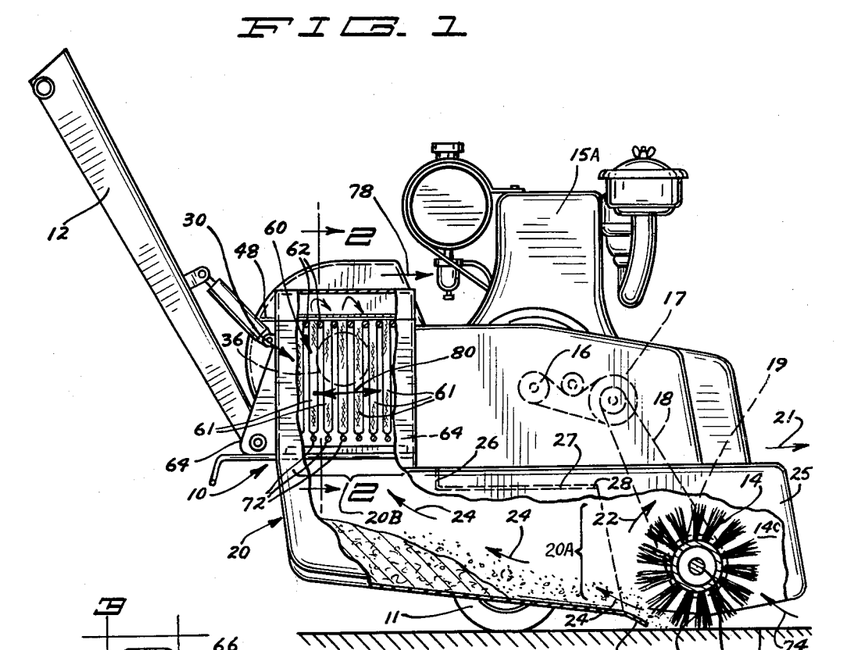
FIGURE 1 is a side elevational view, partly broken away and in section, illustrating an exemplary form of sweeping machine, embodying the invention.

Referring to FIGURE 1, the sweeping machine illustrated in this figure is of the self-propelled "walking" type, and generally comprises a frame 10 having supporting wheels 11 and a guiding handle 12. On the frame there is also rotatably supported a brush 14 having a shaft 15. The frame also supports a power source, in the form of an internal combustion engine 15A, which is provided with an output shaft 16 which is connected by a clutch-transmission arrangement 17 and through belt 18 to the drive pulley 19 of the brush 14. The brush, during the sweeping operation, rotates in the direction of arrow 22, and the normal reaction of the brush bristles 14A against the floor surface F is to pull the machine in a forward direction, arrow 21. Propulsion in the forward direction is accordingly achieved by the rotation of the sweeping brush, but such propulsion may be overcome by the operator, by either pulling backwardly on the handle 12, or bearing down on the handle 12 so as to raise the brush off the floor, in which case the propulsion stops.

On the frame, and to the rear of the brush 14 there is removably mounted a debris and dust-collecting pan 20, which can be mounted on the frame for removal either by a sliding arrangement or by a swinging action. The box is enclosed except for a forward opening which is denoted by the bracket 20A, and an opening denoted by the bracket 20B, which, as will later be explained, is under the dust filter. At the opening 20A, there is a downwardly extending lip 20C, and accordingly as the brush 14 rotates it will project the debris and dust particles backwardly into the pan 20, as shown by the arrows 24. Upon the frame there is a downwardly extending skirt 25, which at least encloses the front and sides of the brush 14, and the rear part of the brush, except for a space into which the collection hopper 20 can project, so as to present opening 20A. Normally, an inner frame or shielding is provided at 26—27—28, and the portion 28, which defines the rear wall of the brush chamber, is provided with an upwardly extending notch to receive the forward end of the debris pan 20.

Figure 2:
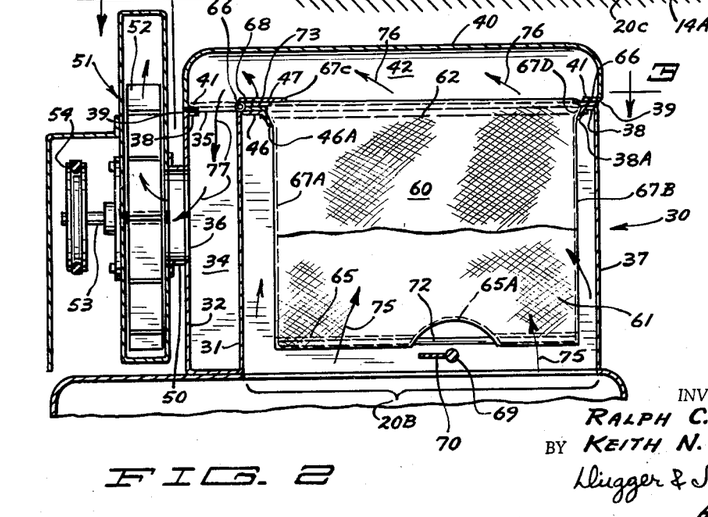
FIGURE 2 is a fragmentary enlarged vertical sectional view taken along the line and in the direction of arrows 2—2 of FIGURE 1.
Figure 3:
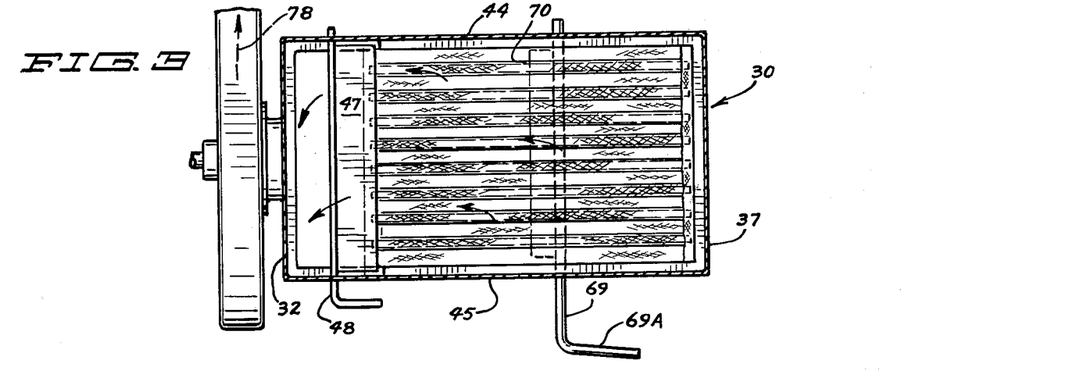
FIGURE 3 is a fragmentary enlarged horizontal sectional view taken along the line and in the direction of arrows 3—3 of FIGURE 2.

Also, on the frame there is mounted a housing generally designated 30, FIGURES 1, 2 and 3, in which there is provided an efficient filtering arrangement. This housing has exterior walls 32, 37, 44 and 45 and an inner wall 31, FIGURE 2, which is spaced from the housing wall 32 by an amount sufficient so as to provide a plenum chamber generally designated 34. This plenum chamber is open at its top 35, and is provided with an outlet opening 36. One edge of the inner wall 31 borders one side of the opening 20B in the frame and an edge of the right end wall 37 of the chamber 30, as shown in FIGURE 2, borders the other, parallel, side of the opening 20B.

The walls 31 and 37, as shown in FIGURE 2, taken with the sidewalls 44 and 45 of the housing 30, as shown in FIGURE 3, form a vertical chamber, which is open at the bottom, coinciding as it does with the opening 20B into the debris collecting hopper 20.

The housing 30 is provided with a flange 38 around the periphery of its upper edge formed by turning in the walls 32, 37, 44 and 45. The flange is equipped with a gasket 39. On this there is a cover 40 which has an inturned flange 41 all around so as to rest on the gasket 39. The cover is held in place in any suitable way, as by latches, not illustrated, and provides a space 42, through which air may flow.

The top edge of the wall 31 is turned in to form a flange 46, as shown in FIGURE 2. The flange 46 and the flange 38 on wall 37 have downwardly extending portions 38A and 46A which are provided with a plurality of spaced notches, and in these notches there are provided bars or tubes, over which the filtering elements, which will later be described, are hung. At the upper part of wall 31, FIGURE 2, there is provided a damper 47 on shaft 48 which may be rotated and held at any position between the full line and dotted line positions as shown in FIGURE 2. In the dotted line position, flow downwardly into the space 34 is entirely cut off and in other intermediate positions the flow is partially cut off.

To the opening 36, FIGURE 2, there is connected the inlet 50 of a suction blower generally designated 51 having a rotor 52 mounted for rotation on shaft 53 which is driven by pulley 54 from the engine 15A. So long as the suction blower is operated, a negative pressure will be induced in the chamber 34 and hence in the space 42 which is above the filtering device.

Referring to FIGURES 1 and 2, the filter generally designated 60 is formed as a plurality of generally planar, generally vertical areas of filtering material, mounted so that the areas are supported in generally spaced relationship and so that pairs of the planar areas form pockets. The mounting is such that the pockets are pendulously supported from their upper portion so that the lower portions of the pocket, are either unrestrained or light restrained and are therefore free to move toward and away from each other, and also free to move at least a limited amount in an up and down relation. The pockets are close enough together so that there can be an interaction between the dusty sides (exterior surfaces) of the pockets for knocking off accumulated dust thereon.

The pockets can most conveniently be made by using a long piece of filtering material which can be a random fiber "textile" or a woven textile such as flannelette. The filtering material, whichever form is selected, is looped downwardly in a number of folds over the rods or tubes 62, each loop being terminated at a substantially uniform level, here illustrated at the lines 64—64. In the bottom of each loop there is sewn a line of stitching as at 65, FIGURE 2, so as to form what amounts to a hem. The stitching is carried up each side of the two parallel areas that comprise the loop as at 67A and 67B to form the pocket. A side flange 66 is sewed on at 67C and 67D so that it lies over the ends of the rods 62, and is gripped between the flange 38 and cover 40 and between the flange 46 and a plate 68 clamped to flange 46 by bolts 73.

Across the bottom of the filter space there is run a shaft 69 which is journalled in the sidewalls 44 and 45. The shaft has a bent end 69A and on it is attached a vane 70. Into the hem formed in each pocket there is inserted a rod 72 which has enough weight that it tends to keep the plane of the cloth generally flat and pulled down from the support rods to the line of stitching at 65. It is intended that the rod 69 and vane 70 shall be rotated so as to strike against the rod 72 for lifting them and hence the pockets for shaking off accumulated dirt, and to this end, the line of stitching at 65 is taken up around the bend 65A, and the filtering material is cut off below this so as to expose the rod 72 for the free striking action of the vane 70. Accordingly, when the rod 69 is rotated or oscillated, the vane 70 will strike the rods 72, thus lifting and wrinkling the filtering material to cause accumulated dust to be shaken therefrom and fall downwardly into the debris collection pan 20, with which the housing 30 communicates.

The vacuum blower 51 induces a negative pressure in the space 42, as previously described, and this negative pressure draws through the area of filtering material thus inducing a negative pressure in the debris collecting pan 20 and with the brush chamber 14C with which it communicates. The brush 14, rotating in the direction of arrow 22, not only has the action of throwing discrete particles and large debris back into the pan 20, but also has a certain "fan" action, and this fan action, with the aid of the negative pressure induced in the chamber via blower 51, causes an inflow of air from the exterior under the skirt 25 around the brush chamber, as illustrated by the arrow 74. The flow then continues via arrows 24 and 75 and thence through the filtering material, where the dust particles are separated. The flow continues via arrow 76 through the space 42, and thence downwardly via arrow 77 into the suction blower from which the flow is exhausted as shown by arrow 78 in FIGURES 1 and 3. When it is desired to clean the filters 60, the shaft 48 is rotated to move cover 47 from the poistion shown in full lines in FIGURE 2 to the position shown in dotted lines, thereby closing off the airflow through the filter, and the shaft 69 is then rotated or oscillated, and the filters are agitated vertically thereby shaking down accumulated dust which may be adhering on the exterior surfaces of the pocket filters.

It is a major advantage of the invention that the dislodgement of accumulated dust from the filters takes place automatically, and manual cleaning action is required infrequently or not at all. This is accomplished due to the fact that the filtering pockets are supported in a pendulous relationship, being free to move backward and forward in the direction of the double arrow 80 as shown in FIGURE 1. As the entire sweeping machine moves along in sweeping, momentary changes in the velocity of the machine, or bumping forward and backward, and generally the manipulation of the machine, provide all of the forces needed to cause the pockets 61 to swing back and forth as shown by the double arrow 80. This pendulum movement is enhanced due to the fact that the pockets have nearly vertical sides and because a mass is provided at the bottom of the pockets which is unrestrained (or only lightly restrained by, for example, a light spring) as shown in co-pending application, Serial No. 794,762, filed February 20, 1959. As a result, the material on the side of the pocket toward which the pocket is swinging is likely to be placed into a slackened condition, and the material on the other side of the pocket tensioned, and this action reversed and repeated successively many times during sweeping. In addition, the rods 72 bounce up and down, thereby producing a strumming action, and the pockets inter-engage each other. The total effect is that accumulated dust and debris on or between the pockets is normally dislodged at a rate sufficient so as not to require any or at least not much cleaning of the filter by the operator. In the event that leaves or pieces of paper, wrappers, etc. should be pulled up between the pockets, dislodgement normally takes place due to the swinging of the pockets, relative to each other, and as a consequence, flow impeding gratings, etc. are not required.

To provide efficient filtering capacity, the planar areas of the filter should be spaced from each other. In the construction just described, this separation is accomplished by the pocket structure and by the weight of the rods 72 which tend to keep the sides of the pockets extended rather than drawn up into contact with one another. A more preferred method of maintaining separation is to insert a spacing structure in the pockets. This form is described with reference to the other embodiments illustrated, and in addition, it could be used in the construction of FIGURES 1–3.

Figure 4:
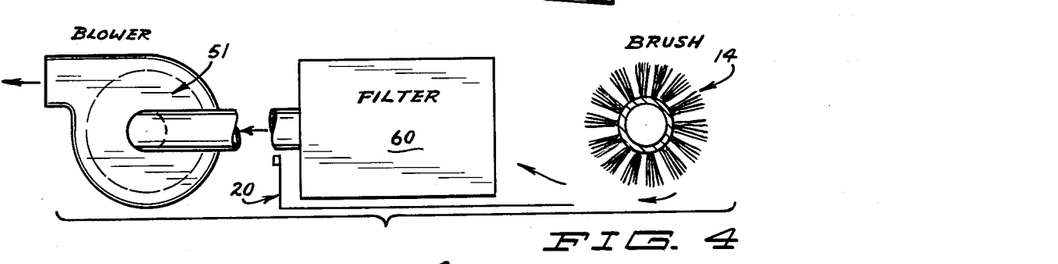
FIGURE 4 is a combined view showing in diagrammatic relationship the sweeping circuit of an exemplary form of the invention.

In FIGURES 1–3, the flow circuit through the cleaning machine is as shown in FIGURE 4, wherein the brush 14 delivers to the pan 20 upon which filter 60 is superimposed, and the flow is through the filter 60 to the vacuum blower 51. In this form of circuit, the filter is interposed between the brush and the blower, and consequently the blower handles air which has been cleaned by the filter. In some forms of sweeping machines, the blower is interposed between the brush and the filter, and in such event, the blower handles dusty air. Both forms of circuits are used, largely depending upon the geometry of the entire machine.

Figure 5:
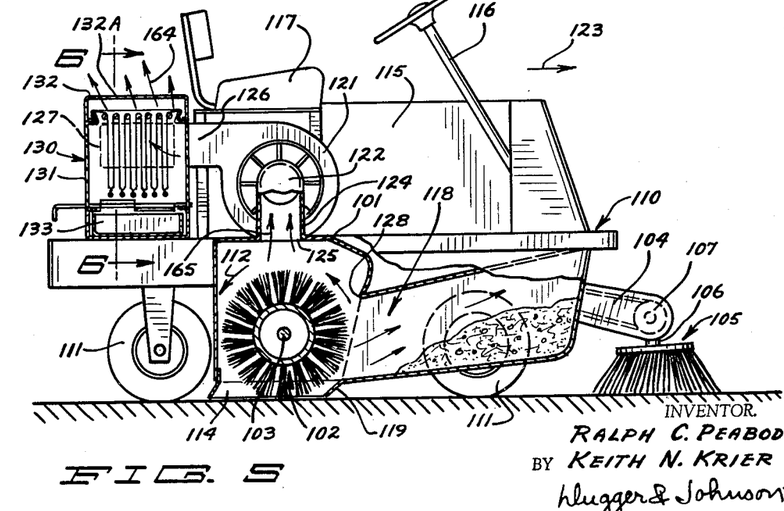
FIGURE 5 is a vertical side elevational view partly broken away and in section showing another exemplary form of sweeping machine embodying the invention.
Figure 6:
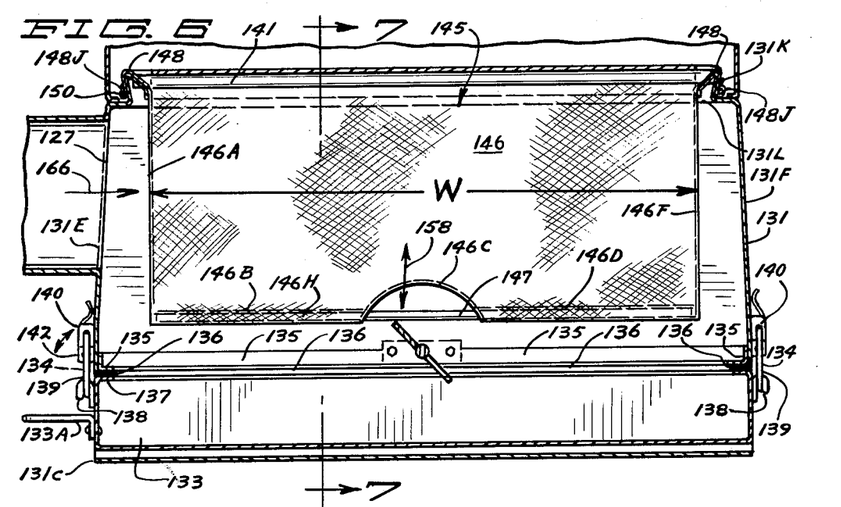
FIGURE 6 is an enlarged, fragmentary vertical sectional view taken along the line and in the direction of arrows 6—6 of FIGURE 5.
Figures 7, 8:
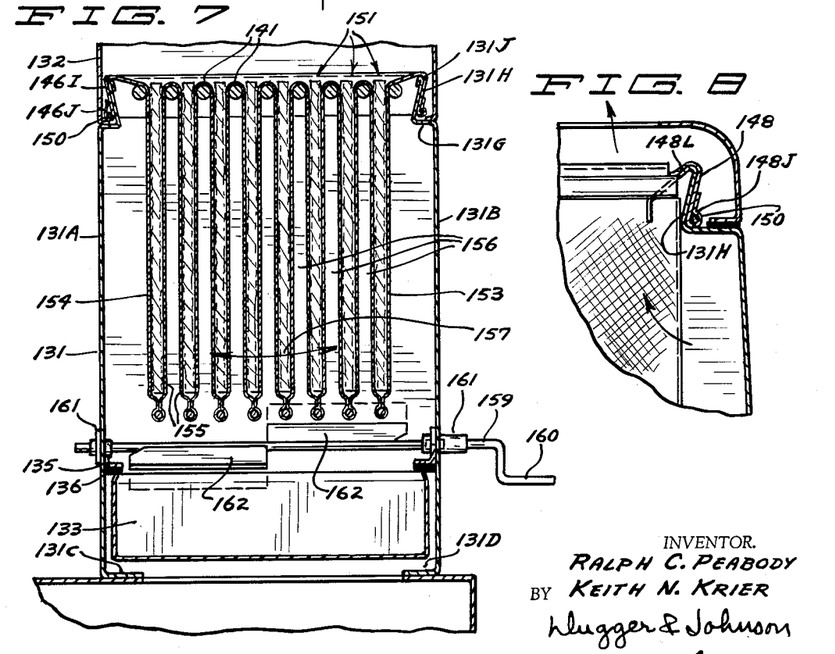
FIGURE 7 is a fragmentary enlarged vertical sectional view taken along the line and in the direction of arrows 7—7 of FIGURE 6.
FIGURE 8 is a much enlarged fragmentary vertical sectional view of a portion of FIGURE 6.

In FIGURES 5, 6 and 7, there is illustrated a sweeping machine wherein the blower is interposed in the circuit between the rotating brush and the filter. In FIGURE 5 the frame generally designated 110 is provided with support and propulsion wheels 111 which are connected to a drive motor 115 and to the steering wheel 116, as is well known in the art. The machine is provided with a sweeping housing generally designated 101 which serves to house a brush generally designated 102 which is rotatably supported on the shaft 103. The brush is arranged to be rotated by power from the power source 115, through any suitable transmission gearing. In this sweeping machine there is also provided a forwardly extending frame support 104 upon which a curb brush 105 is mounted about the shaft 106 and is driven through a suitable transmission 107 from the power source 115. In this particular machine the operator position is at 117 and the vehicle moves in the direction of arrow 123. Rotation of the brush is in the direction of arrow 112. The housing 101 is provided with downwardly extending skirts 114 all around, and is provided with an opening 128 at its forward end, into which there extends the open rear end of an otherwise closed dust and debris collection hopper generally designated 118, which is mounted upon the vehicle 110 so that it can be removed therefrom, either as a drawer, or by swinging motion, either by hand or through power means. This debris collection hopper is provided with a downwardly extending lip 119, which is closely adjacent the circle of rotation of the bristles of brush 102. Upon the vehicle there is provided a suction blower 121 which is connected by a transmission, not shown, to the motor source 115, the suction inlet 122 of the blower being connected by the duct 124 to an opening 125 in the brush housing 101. The outlet 126 of the blower extends into an inlet opening 127 in a filtering arrangement generally designated 130, which is best shown in FIGURES 6, 7 and 8.

The filter 130 consists of a tubular body 131, a removable cover 132, and a removable pan 133. The body 131 has sidewalls 131A and 131B which extend downwardly as shown in FIGURE 7 and are provided with an inturned flange at 131C and 131D. This tubular body has endwalls 131E and 131F, as shown in FIGURE 6, said endwalls being terminated at the level of line 134—134 so as to leave between the sidewalls 131A and 131B, below this level, openings into which the pan 133 may be manipulated, and attached. Just above the level of line 134, the tubular body 131 is provided with an angular flange 135, which runs entirely around the inside of the tubular body 131. On the bottom side of this flange there is cemented a resilient gasket 136.

The pan 133 is rectangular in shape and has vertical sidewalls which are inturned at their upper edge to provide a flange 137 which dimensionally fits the shape defined by the gasket 136. At opposite ends of the pan there are provided hooks 138—138 to which the bales 139 of the clamps 140 can be detachably secured. These clamps are the overcenter type, with the manipulating portion pivoted at 142 so that the bales 139 can be raised and lowered. When lowered, the bales can be unhooked and the pan 133 which at that time is also lowered, can be removed by means of its handle 133A for emptying or servicing. When the pan is re-inserted and bales 139 put in place, the manipulating portion of the clamps are again swung up and through an over-center motion and locked in place, thereby compressing the flange 137 of the pan against the gasket 136 and providing an air-tight connection to seal the bottom portions of the tubular body 131 against outflow of air.

At the upper portion of the tubular body 131, on each side, there is an inturned flange 131G which is substantially horizontal and this flange is then continued upwardly and outwardly at 131H and then rolled over through a 180° bend at 131J, so as to provide a smooth edge all around. At the endwalls 131E and 131F, this rolled over flange is made not quite a full 180° bend, being extended inwardly and downwardly at 131K and then terminated throughout a vertical portion 131L. The portions 131K of the flange at opposite endwalls are provided with a plurality of rounded notches, in spaced relation, so as to receive therein tubular support members 141. These are preferably lightweight tubes of steel or aluminum. The filter generally designated 145 is composed much like that described with reference to FIGURES 1–3, being composed of a length of filtering membrane 146 which has a width W as shown in FIGURE 6, and a length sufficient to provide as many downwardly extending loops as desired, depending upon the capacity of the filter. These loops are made of uniform vertical height, as shown in FIGURE 7. Along the sides of the loops, and across the bottom, there is a line of stitching 146A, 146B, 146D and 146F. At or near the center of the width of the filter loops the stitching is curved up around the portion 146C and the material composing the filter loop is cut away below this point. The line of stitching 146B–146D forms a hem 146H and in this hem there is disposed a round rod 147 of steel or other material sufficiently heavy so as to pull the pocket downwardly and thus normally dispose it vertically. The hem 146H may be closed at the end to hold the rods 147 against endwise displacement.

At the ends of the length of filtering membrane, adjacent the sidewalls 131A and 131B of the tubular body 131, the membrane is drawn over the rounded edge 131J at 146I and brought down along the downwardly and inwardly slanting portion 131H and another smaller hem 146J is provided. The width of the material W as shown in FIGURE 6, runs lengthwise of the tubular body 131, i.e. along its longer dimension, and where the loops of material reach up to the rods 141, and just above the rod 141, there is sewn on a supplementary flange 148—148 at each side, and this flange is stitched to the material forming the pockets by a line of stitching 148L which intersects the lines of stitching 146A and 146F by which the vertical filtering pockets are defined at their side edges. The flanges 148—148 are turned up so as to form a hem 148J corresponding to the hem 146J and a drawstring 150 is inserted in the hems 146J–148J, all the way around, and is pulled tight, thereby pulling the hems 146 and 148J tightly against the inwardly and downwardly extending portions 131H at the upper termination of the sidewall 131. In this way, the entire filter assembly, comprising a plurality of pockets, is sealed against the outward flow of dust-laden air, around the top of the filter.

Into each of the generally planar pockets thus formed there is inserted a separator described in detail later in the specification, generally designated 151, which is capable of maintaining the sides of the pockets in spaced relation. The thickness of the separators is such that the sides of the pockets are substantially parallel to each other, thus forming spaced planes of filtering material. The external surface of the filter is thus composed of the end surfaces 153 and 154 and a plurality of internal surfaces 155 between the pockets. These internal surfaces are accessible because of the spaces 156 between each successive pocket, but the pockets are otherwise free to move backward and forward in the direction of the double arrow 157, as shown in FIGURE 7, and they are also capable of movement up and down as shown by the double arrow 158 in FIGURE 6. The pockets are illustrated an unrestrained at their lower portions, but they may be only lightly restrained so as to easily permit sidewise motion, as shown in co-pending application, Serial No. 794,762, filed Feb. 20, 1959, previously referred to. A free hanging pocket suspension is preferred under most conditions.

The separators 151 do not interfere with at least some upward displacement of the lower edge of the pocket, under which condition the planar surfaces forming the pockets are subjected to bending and wrinkling, and this aids in the dislodgement of dust from the exterior surface of the pockets. Likewise the free swinging movement of the pockets in a direction generally transverse to their normal position under conditions of rest, will cause them to move against each other, thus further enhancing the loosening of accumulations of dust on the surface. The upward movement of the pockets is provided by a shaft 159, provided with a crank 160, journalled in the sidewalls 131A and 131B, by means of the journals 161—161. This shaft is provided with two radially extending vanes 162—162, each vane being approximately one-half the length of the shaft, radially oppositely disposed. Accordingly, when the shaft 160 is turned, the vanes 162—162 will successively be brought into engagement with the exposed central portions of rods 147 of first one-half and then the other half of the hanging pockets, as shown in FIGURE 7, and these pockets will be oscillated up and down in the direction of the double arrow 158 thereby causing them to bend and wrinkle and shake to loosen accumulations of dust from their exterior surfaces. Also, as the vehicle moves and jerks back and forth and bumps up and down, which is perfectly normal for the vehicle, the pockets will be swung back and forth in the direction of double arrow 157, and shaken up and down. This is due to the free hanging pendulous mounting of the pockets, where they are unrestrained, or only lightly restrained at the bottom. The cover 132 is in this instance provided with a grating at 132A, through which the cleaned air can discharge as indicated by arrows 164. The flow of dirty air accordingly is withdrawn from the brush chamber as shown by arrows 165, thence into the intake 122 of the blower 121 whence the flow is discharged as shown by arrows 166 into the intake of the filter, as shown by FIGURE 6. This dirty air is distributed between and through the depending pockets and is filtered, thereby causing the dust to be separated from the air. It will be noted that in FIGURE 6 the dust-laden air is discharged in a direction generally parallel to the filtering pockets spaces 156 between said filtering pockets. Internal baffling not illustrated may be provided so as to insure even distribution of the dust-laden air to all surfaces of the filter pockets.

If desired, any one of the filtering pockets may be considered as the end pocket of the arrangement, and the material is then simply drawn out to form the flange 146I and hem 146J. This simply means that one or several of the end pockets may be skipped, and the filter capacity thus reduced from the maximum capacity for a given size housing 131.

Figure 9:
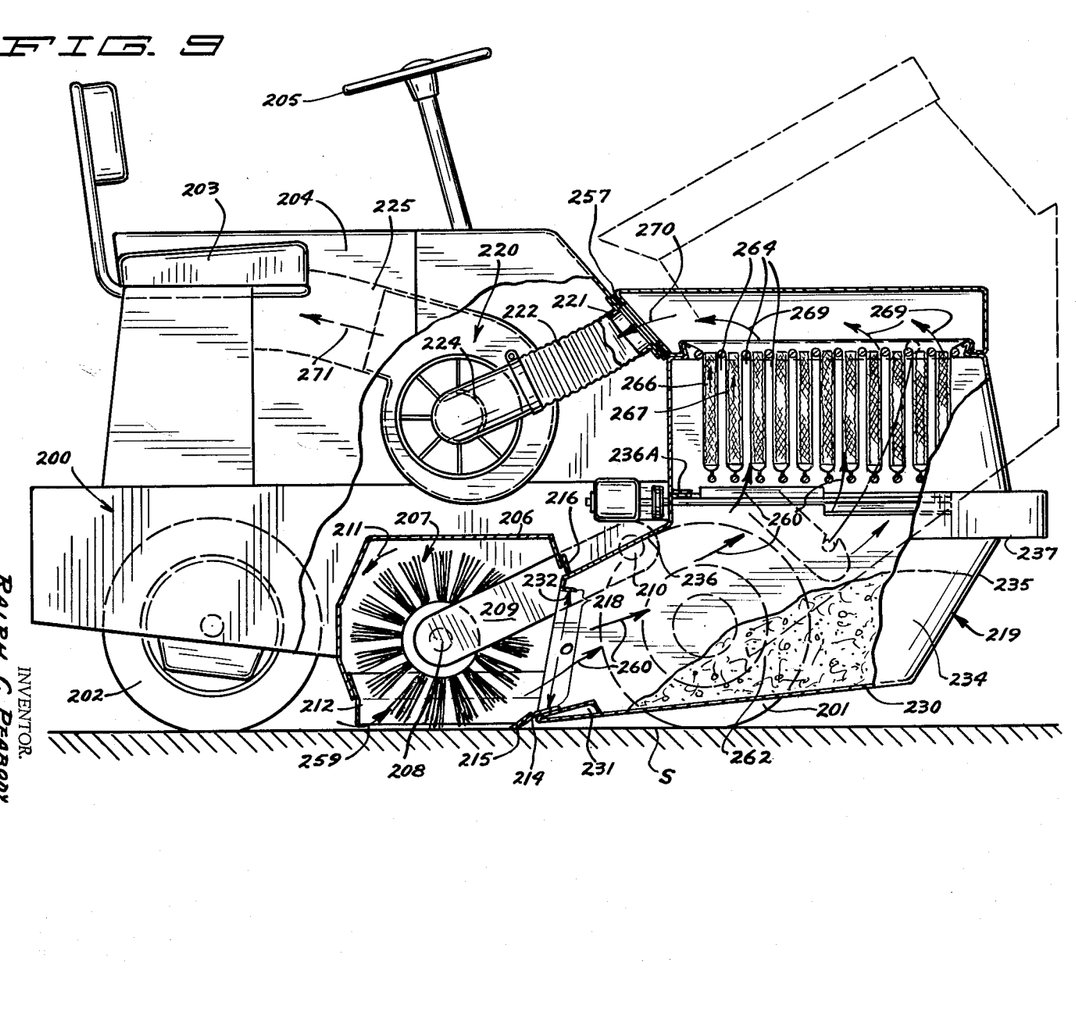
FIGURE 9 is a side elevational view partly broken away and partly in section illustrating still another exemplary form of sweeping machine embodying the invention.
Figure 10:
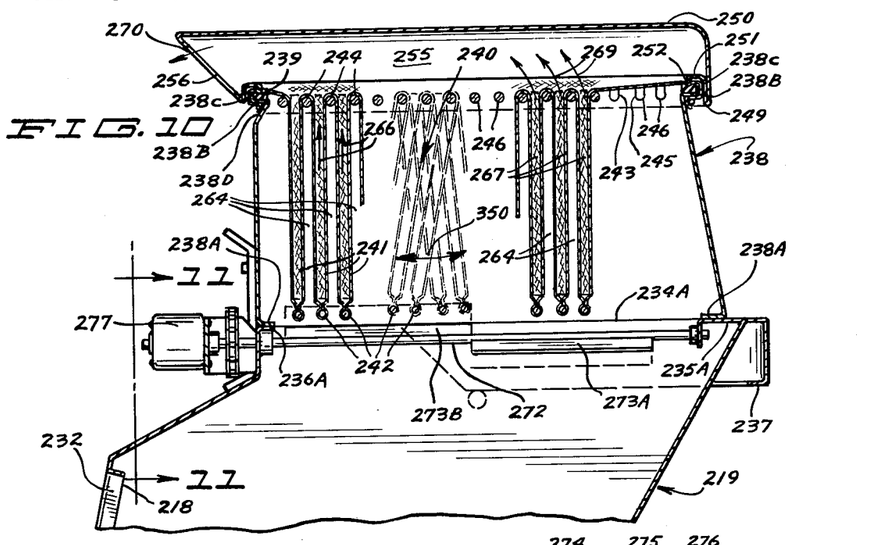
FIGURE 10 is an enlarged fragmentary vertical sectional view of the portion of the machine shown in FIGURE 9.
Figures 11, 12:
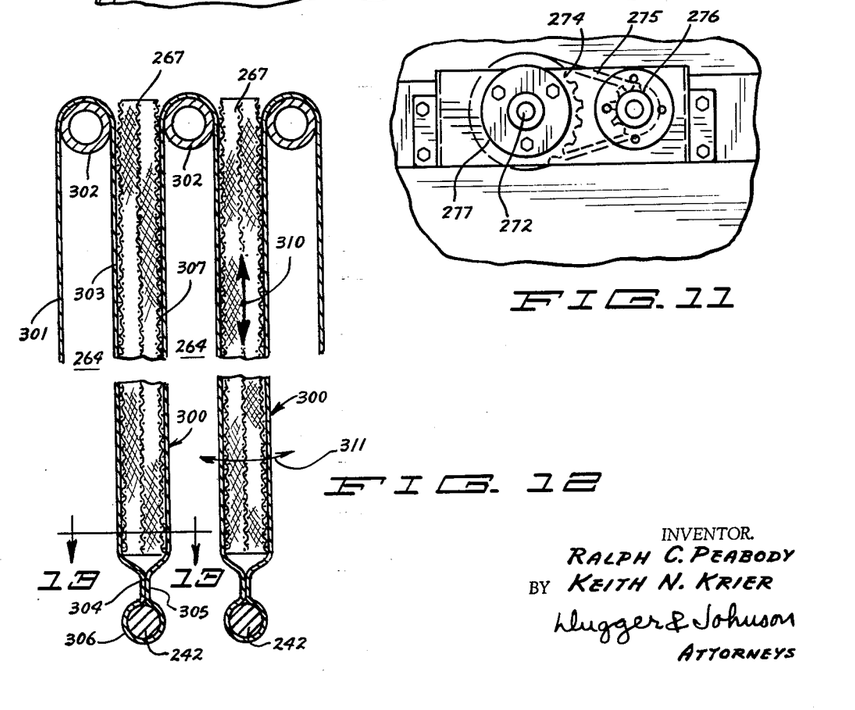
FIGURE 11 is an enlarged fragmentary vertical elevational view taken along the line and in the direction of arrows 11—11 of FIGURE 10.
FIGURE 12 is an enlarged vertical sectional view of the filter elements, separated from the machine, and in the relationship shown in FIGURE 10.

Referring to FIGURES 9, 10 and 11, there is illustrated a further exemplary sweeping machine embodying the invention. In this machine a mobile frame 200 is provided with propulsive and steering wheels 201–202. An operator seat is provided at 203 and a power source, not shown, is contained within the housing 204. Steering the vehicle is accomplished by means of the steering wheel 205. Upon the mobile frame there is a downwardly opening transverse enclosure 206 between the front and the rear wheels in which a cylindrical rotary brush generally designated 207 is mounted for rotation about the axis 208, the axis 208 being on radius rods 209 which are pivoted at 210 to the vehicle frame. Provision, not illustrated, is made for adjusting the position of the radius rods 209 up and down for raising and lowering the brush, and a suitable power connection is provided to the brush 207 so it can be rotated in the direction of arrow 211, by power derived from the power source under the housing 204. The enclosure 206 is provided with a flexible skirt 212 on its rear and side edges, and the forward edge of the sweeping opening is defined by a structural member 214 extending across the vehicle from one side wall to the other of the sweeping opening 206. This structural member 214 may be provided with a flexible edge 215 which engages the surface edge which is being swept. The front wall of the sweeping enclosure 206 is provided with an opening depicted by the dimension O, which extends from between the sidewalls of the housing, and is defined at its lower edge by the structural member 214 and at its upper edge by a flexible seal 216. Into this opening, which is rectangular in dimension, there extends the filling and discharge opening, the mouth 218 of a debris collecting container generally designated 219. This container is illustrated in FIGURE 9 and the upper portion thereof is illustrated in FIGURE 10.

In general, it may be stated that the container 219 combines the functions of a debris collection chamber and a filtering chamber and the entire container has arrangements therein by which the clean side of the filtering arrangement can be connected to an exhaust blower generally designated 220 which is mounted in stationary relationship on the vehicle 200. The container itself is mounted by devices not illustrated to be moved from the solid line position shown in FIGURE 9 to the dotted line position also shown in this figure, and in the latter position the sweeping composed of debris, dirt and dust can be discharged through the mouth 218 through which such debris, dirt and dust was originally swept during the sweeping operation.

The frame of the vehicle 200 is provided with a flange opening at 221 which is connected by a flexible tube 222 to the inlet 224 of the blower 220. The discharge of clean air from blower 220 is via ductwork 225 to atmosphere.

Referring to FIGURE 9 and particularly to FIGURE 10, the collection chamber 219 has an upwardly sloping bottom 230 which has a reinforced edge 231 at its mouth, which is arranged when in sweeping position to underlie the structural member 214 which defines the lip over which the brush sweeps into the collection chamber. The chamber suitably flanged at 232, around the balance of the mouth 218 so as to be sufficiently strong to resist deflection. The sidewalls 234, the front wall 235 and the inner rear wall 236 extend upwardly to the top of the main debris collection chamber which is generally rectangular. At the top these walls are flanged inwardly as at 235A, 234A and 236A, and this upper opening of the main debris collection chamber is reinforced by an exterior channel 237 which serves as a bumper and a strengthening edge at this position in the assembly. Upon the opening defined by the flanges 234A, 235A and 236A, there is superimposed a cylindrical extension or sleeve generally designated 238 which serves to house the filtering elements of the assembly. This sleeve 238 is likewise provided with an inturned flange 238A at its lower edge which is immovably attached to the flanges 234A, 235A and 236A at the upper edge of the main debris collection chamber.

In general, the sleeve 238 is constructed as previously described with reference to the filter shown in FIGURES 6 and 7, except that in this instance the walls are bent in along the rear wall and sidewalls, as at 238D, and then brought out horizontally at 238B and then provided with a slight upstanding lip 238C. Since the front wall of sleeve or housing 238 already has some inward slant, this is only provided with the horizontal flange 238B and the lip 238C. The flange 238B and lip 238C serve as a resting place upon which a gasket 239 of resilient material is cemented. The constructed of the filter generally designated 240 is as described with reference to the device shown in FIGURES 5–8, being provided with a plurality of pockets 241 which are formed of, preferably, a single length of filtering material. The width of the material runs cross-ways of the machine, as shown in FIGURES 9 and 10. These pockets are formed with lower hems into which a plurality of rods 242 are placed, all as previously described, and the pockets are supported at their upper terminations, between pockets by a plurality of tubes 244 which, as previously described, are supported in notches 246 in the downwardly extending flanges 245 on opposite sidewalls of the filter housing 238 at its upper termination. The filter assembly is provided with sewed on side flanges, not illustrated, similar to those at 148 in FIGURE 8, and with a drawstring 249, by which the top of the entire filter assembly may be drawn in and attached to the upper part of the housing 238.

Upon the housing 238, together with the filter as assembled therein, there is placed a cover 250 which is provided with a flange 251 on the inside having a downwardly terminating edge 252, which bears on the side flange of the filter and the ends of the filter membrane where it crosses the gasket 239. The cover is retained in place by a plurality of buckles, not illustrated, along the side edges.

The cover provides a space 255 above the filter, which is completely enclosed, except that an aperture is provided at 256 which will register with the port 221 of the vacuum blower. A gasket 257 is provided on the vehicle around the port 221, and when the entire assembly of 219 is lowered into place as shown in full lines in FIGURE 9, a sealed connection will thus be established between the opening 256 of cover 250, and the port 221 of the vacuum blower. As a result of the suction thus applied by the vacuum blower 220, and due to the fan action of the brush 207, an inflow of air will occur at ground lever under the flexible sealing edges 212 and 215, and into the sweeping chamber 206. This inflow of air is denoted by arrow 259. The flow of air thus prevents the outflow of dust and to a very considerable extent prevents the brush from kicking out larger granules of sand and grit from the edges of the width being swept (i.e. from the ends of the brush which is to say, the sides of the vehicle). The inflow of air, denoted by arrow 259 continues as shown by the arrow 260 through the mouth 218 of the collection chamber 219. At this point, the heavier material will fall and accumulate at 262, while the dust-laden air will rise and will be drawn through the filtering surfaces. The upflow of dust-laden air is nicely distributed by this arrangement into the spaces 264 between successive filter pockets. Upon passing through the filter, the cleaned air will move as in the direction of arrows 266 through the separators 267, which are of a form previously referred to, and which will be described in detail hereinafter. The cleaned air then emerges via arrows 269 and thence continues through the opening 256 and into the suction side of the vacuum blower, as shown by arrow 270, whereupon the clean air after passing through the vacuum blower is discharged to atmosphere via arrow 271.

The accumulation of dust is dislodged from the exterior surfaces of the filter pockets in a manner previously described. The filter pockets are in this instance arranged to be agitated by a motor driven shaker shaft 272 having a plurality of oppositely disposed vanes 273A and 273B thereon. The shaker shaft 272 is provided with a sprocket 274 being driven by a chain 275 from sprocket 276 on motor 277. The motor is mounted on the collection entity 219, and is supplied by electric or hydraulic power through a flexible connection, not shown, from the main vehicle 200.

It has been discovered that filtering capacity of practically any amount desired, within reasonable limits, can be provided, according to the present invention, by the plurality of filtering pockets, constructed as herein described, wherein the pockets are composed of generally upright and generally planar areas of filtering material set very close together, and maintained in spaced relation by a flexible interior support. Referring to FIGURES 12 through 16, there are further illustrated the details of the pocket construction and especially the interior supports therefor. Thus, in FIGURE 12, the individual pockets 300—300 are composed of a single length of material 301 which is looped over the tubes 302. Of course, it will be understood that if a single length of material is insufficient, a seam may be sewn without interfering to any degree with the construction. The length of material continues up over the first tube 302 and then down as a planar area at 303, then bending in at 304 where the material is caught by the line of stitching at 305, thence around the hem 306 which contains the weight rod 242, and thence continuing again at the line of stitching 305 and thence up through the planar portion 307, thence around another rod 302, and successively through a plurality of pockets. The rods 242 are unrestrained, or at the most only lightly restrained by very flexible tensioning means, such as a light spring, the unrestrained support being preferred. It will be understood that the pockets are provided with side seams at 146A and 146F in FIGURE 6, and with a retaining flange at the side edges and ends of the filter assembly, as previously described.

In the pockets thus formed, the separators 267—267 are disposed and held by friction. The separators are flexible and may be compressed in a direction parallel to the plane of the separators, as denoted by the double arrow 310, and being flexible, they may also be bent and to some extent wrinkled. Bending is easily accomplished in the direction depicted by the double arrow 311, as occurs when the pocket as a whole swings pendulously. As a result, the overlying filter material is agitated, bent, and to some extent wrinkled, and accumulations of dirt are easily dislodged therefrom, thereby falling downwardly in the spaces 264—264.

Figure 13:
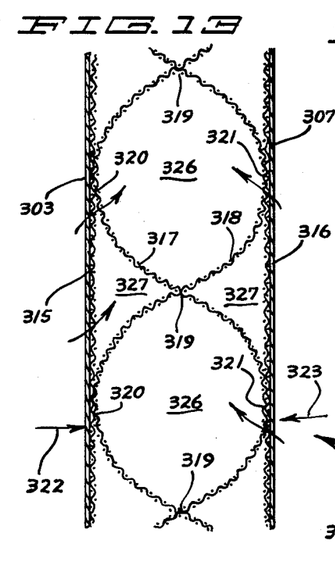
FIGURE 13 is a much enlarged horizontal sectional view taken along the line and in the direction of arrows 13—13 of FIGURE 12.
Figure 14:
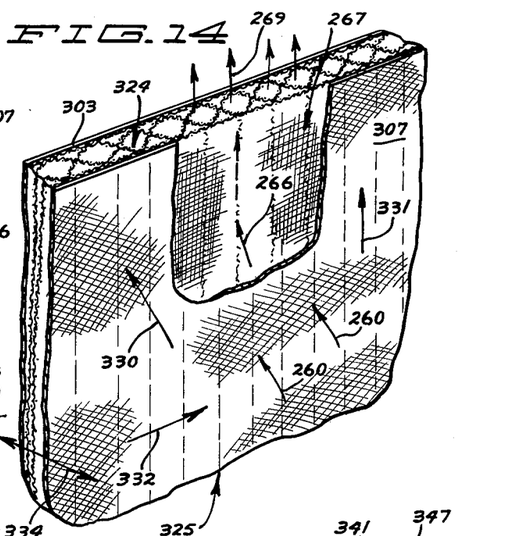
FIGURE 14 is a perspective view partly broken away and partly in section illustrating a preferred form of filtering element untilized in the present invention.

While the separator may be made of several different materials, several preferred forms of separators are shown in FIGURES 13–16. In FIGURES 12–14, there is illustrated a separator composed of plastic material which is woven as one plane of woven material at 315 and another plane of woven material at 316, both of these being generally flat. The planes 315 and 316, are connected together by curved surfaces of woven material 317 and 318. Where the curved surfaces 317 and 318 cross at 319, the weave intersects, and thus makes a strong and sturdy connection, albeit it is capable of deflection, and likewise, where these curved surfaces intersect each of the generally flat planes 315 and 316 of woven material, the weavings intersect as at 320 and 321. Consequently, the entire object presents two surfaces 315 and 316 of open woven material much like a fly screen, except that it is made of plastic strands, and these weaves intersect with other curved surfaces of woven material 317 and 318, and are joined thereto.

The entire woven composite can be compressed to some extent by pressure against the exterior surfaces of layers 315 and 316, as by pressure in the direction of arrows 322 and 323, and if pressure or a gentle force is exerted against the edges of the composite as in the direction of arrows 324 and 325, in FIGURE 14, a certain amount of compression will also take place. It will be noted that the composite presents open channels 326 and 327, and in use in the filter, these channels are arranged so that they run generally upwardly, either vertically as shown in FIGURE 14, or on a diagonal upwardly. The diagonal arrangement, which simply means that the axes of the channels would be parallel to the arrow 330 of FIGURE 14, provides a somewhat easier edgewise compression, whereas when the axes of the channels parallel the arrow 331, the ease of compression edgewise of the composite is somewhat reduced. In any event, the open weave of the connecting curved surfaces 317 and 318 provides ample communication from channel to channel, and as a consequence, the flow of air edgewise of the composite such as in the direction of arrow 331 or transversely of the channels as in the direction of arrow 330, or even in a direction completely transverse to the channels, as in the direction of arrow 332, can easily be accomplished. It is preferred to set the composite upright as in the direction of arrows 331 or slightly inclined as when the channels are oriented so that they lie parallel to the arrow 330. Movement of the entire composite transversely of its general flat plane, in either direction as depicted by arrow 334, FIGURE 14, is easily possible, and the separator as a whole therefore does not impede the pendulous motion of the filtering pockets. At the same time, it will be appreciated that when a pocket moves in one direction as a pendulum, slight bending will take place, and that filtering surface which is on the inside of the bend will tend to be placed in somewhat greater tension, and as this motion reverses due to the oscillating swinging motion of the pockets, an excellent dislodging action for accumulated dust will ensue.

In FIGURES 13 and 14, the cloth which is denoted by the sheet 301 in FIGURE 12 forms the sides 303 and 307 in FIGURE 13. In FIGURE 14, the side 307 of the filtering cloth is broken away at one part to show the appearance of the underlying spacer which as a whole is shown at 267. In FIGURES 13 and 14, the movement of the dust-laden air via arrows 260 passes through the filtering surfaces 303 and 307 and being thus filtered, as clean air continues at 269 upwardly through the filter separator 267 predominantly along the channels 326 and 327, but also as required through the open weaving which defines the channels, and hence by interchannel flow. This interior flow is in the direction generally of arrows 331, when the separator is placed with the channels entirely vertical, but would be in a slantwise direction such as in the direction of the arrow 330 or entirely crosswise as shown by arrow 332, where the separator is disposed at an angle or with the channels horizontal, as the case might be.

Figure 15:
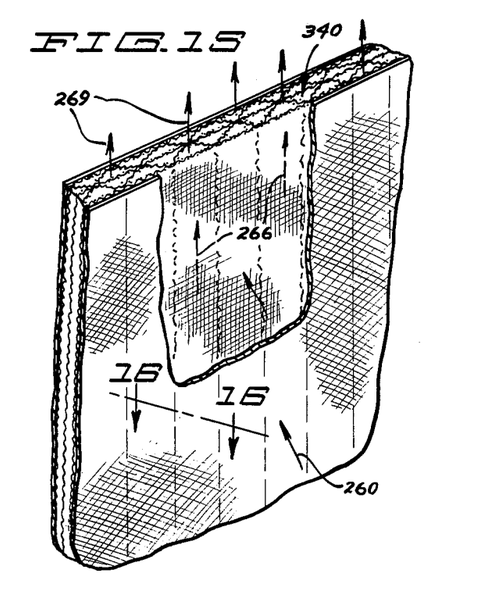
FIGURE 15 is a perspective view partially broken away illustrating another form of filtering element used in the present invention.
Figure 16:
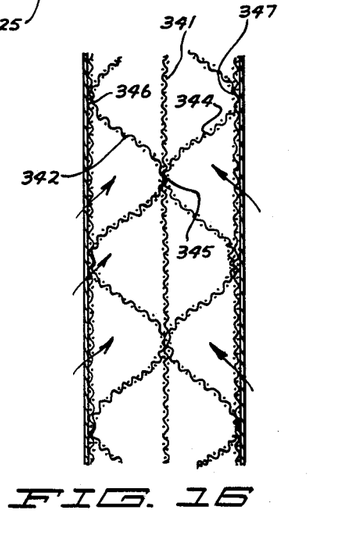
FIGURE 16 is a horizontal sectional view corresponding to FIGURE 13, through the form of filtering element shown in FIGURE 15, FIGURE 16 being taken along the line and in the direction of arrow 16—16 of FIGURE 15.

In FIGURES 15 and 16, the separator generally designated 340 is formed essentially in the same manner as the separator described in FIGURES 14 and 15. In this structure, however, a central layer 341 is woven in, and the curved surfaces of woven material 342 and 344 are interwoven at 345 with the central layer and interwoven with the exterior layers at 346 and 347. The action is the same as with reference to FIGURES 13 and 14. The rigidity of the entire composite of the separator generally designated 340, is somewhat greater than the one shown at 267.

Referring to FIGURE 10, in this figure the movement of the filter pockets 242, due to vehicular movement and also due to lifting of the collector pan 219, as during dumping, is shown for the central pockets, the swinging movement being shown by the double arrow 350. In this figure, there is also illustrated the condition where a filter is used that requires less than the full amount of space offered by the sleeve 238. Thus, for some of the notches 246 there are not provided any tubular supports 244 and the filtering material is simply carried forward at 243 and attachment made, thus blanking off the area of the filter shown in the last three notches 246. This is done, where it is desired to use a standardized size of sleeve 238 for filter capacities less than maximum capacity.

The filter units, as herein illustrated may be set with the plane of the filter pockets normal to the direction of straight forward travel of the vehicle as illustrated or parallel to such direction. When arranged normal to the direction of straightforward direction of motion (illustrated) the pendulous swinging motion of the filter pockets will be due to increase and decrease in velocity, changes in grade and general irregularities of motion having fore and aft components of acceleration relative to the vehicle. When the filter pockets are set parallel to the straight forward direction of motion of the vehicle, any vehicle movement having an acceleration component in a direction transverse to the vehicle, as for example, turning, tipping, swaying, and the like will cause pendulous movement of the filter pockets.

As many widely apparently different embodiments of this invention may be made without departing from the spirit and scope thereof, it is to be understood that I do not limit myself to the specific embodiments herein.

What is claimed is:

1. In a mobile sweeping machine mounted for movement over a surface, said machine being thereby subjected to acceleration forces incidental to such movement, said machine having thereon an enclosure for a power driven brush, a dust collection chamber mounted on the machine and connected to said enclosure, and suction blower means on the machine connected to the chamber for moving through the chamber the dust laden air originating in said enclosure, the chamber being connected in circuit to said suction blower so that the dust laden air moves generally upwardly therethrough, the improvement comprising a filter across the chamber in the path of upward movement of the dust laden air, said filter being composed of a plurality of adjacent upwardly opening, downwardly depending pockets of filter fabric set side by side in spaced relation and connected together at their upper ends and connected to the walls of the chamber, said pockets being supported at their upper ends and hanging unrestrained downwardly in the chamber in a direction generally opposite to the movement of the dust laden air in the chamber, and separate spacer means in each of said pockets, said spacer means comprising a member made up of inter-laced filaments of material forming an open work structure providing a plurality of individual points of support for each of the filter pocket walls where the filaments are supported by other filaments, said spacer means being operable to hold the opposite side walls of said filter pockets substantially in spaced apart planes, said spacer means being flexible in the plane of the pockets and transverse to the plane of the pockets and permitting air flow in the plane of the pockets and transverse to the pockets.

2. In a mobile sweeping machine mounted for movement over a surface, said machine thereby being subjected to acceleration forces incidental to such movement, said machine having an enclosure for a power driven brush, a dust collection chamber mounted on the machine and connected to said enclosure, suction blower means on the machine connected to the chamber for moving through the chamber the dust laden air originating in said enclosure, said chamber being connected in circuit with said suction blower so that the dust laden air moves generally upwardly therethrough, the improvements comprising a filter barrier wall across the chamber in the path of upward movement of the dust laden air, said wall being composed of a plurality of adjacent upwardly opening downwardly depending pockets of filter fabric set side by side in spaced relation and connected together at their upper ends and connected to the walls of the chamber, said pockets being of generally planar configuration having spaced oppositely disposed side walls with easily deflectable reticulated spacer means of woven plastic screen material between the walls for holding said walls apart, said spacer means having a thickness equaling the spacing between the pockets walls and being of generally planar configuration and deflectable normal to the place of the pocket and in said plane, said pockets being supported at their upper ends with the remainder of the pocket hanging unrestrained downwardly in the chamber in a direction generally opposite to the movement of the duct laden air in the chamber, the hanging portions of said pocket being oriented so that they are free to move under the influence of said acceleration forces for dislodging accumulated dust and trash from the outside of the pockets as the machine is operated.

3. In a mobile sweeping machine mounted for movement over a surface, said machine being thereby subjected to acceleration forces incidental to such movement, said machine having thereon an enclosure for a power driven brush, a dust collection chamber mounted on the machine and connected to said enclosure, and suction blower means on the machine connected to the chamber for moving through the chamber the dust laden air originating in said enclosure, said chamber being connected in circuit with said suction blower so that the dust laden air moves generally upwardly therethrough; the improvement comprising a filter barrier wall across the chamber in the path of upward movement of the dust laden air, said wall being composed of a plurality of adjacent upwardly opening downwardly depending pockets of filter fabric set side by side in spaced relation and connected together at their upper ends and connected to the walls of the chamber, said pockets being supported at the upper ends about axes positioned substantially transverse to the direction of movement of the sweeping machine, the lower portions of the pockets hanging unrestrained downwardly in the chamber in a direction generally opposite to movement of the dust laden air in the chamber, a separate rod weight attached to the lower portion of each pocket and lying in the plane of the pocket, a shaft rotatably mounted in said chamber and positioned below the lower ends of said pocekts, at least one vane on said shaft extending radially outwardly therefrom, said vane being of size and positioning to strike said rods as said shaft is rotated, each of said pockets being provided with a cut away portion aligned with shaft and of sufficient size so that the vane on said shaft does not strike the pocket material when said shaft is rotated, and means to rotate said shaft.

4. In a mobile sweeping machine mounted for movement over a surface, said machine being thereby subjected to acceleration forces incidental to such movement, said machine having thereon an enclosure for a power driven brush, a dust collection chamber mounted on the machine and connected to said enclosure, and suction blower means on the machine connected to the chamber for moving through the chamber the dust laden air originating in said enclosure, the chamber being connected to circuit with said suction blower so that the dust laden air moves generally upwardly therethrough, the improvement comprising a filter across the chamber in the path of upward movement of the dust laden air, said filter being composed of a plurality of adjacent upwardly opening, downwardly depending pockets of filter fabric set side by side in spaced relation and connected together at their upper ends and connected to the walls of the chamber, said pockets being supported at their upper ends about axes transverse to the direction of movement of the vehicle and the lower portions of the pocket hanging unrestrained downwardly in the chamber in a direction generally opposite the movement of the dust laden air in the chamber, and separate spacer means in each of said pockets, said spacer means comprising a member made up of woven strands of material forming an open work structure providing substantially continuous support for the filter pockets to hold the opposite side walls for said filter pockets in spaced apart planes, said means being flexible in the plane of the pocket and transverse to the plane of the pocket and permits air flow in the plane of the pocket and transverse to the pocket.

5. The combination as specified in claim 4 wherein said spacer means is comprised as woven strands of material forming two spaced apart screens for supporting opposite walls of said filter bag, and means for maintaining said screens in spaced apart relationship, said means comprising an open work structure permitting air flow transverse to the plane of the filter bag and in the plane of the filter bag in any direction.

(References on following page)

References Cited by the Examiner

UNITED STATES PATENTS

| | | | |
|---|---|---|---|
| 569,644 | 10/96 | Jacobson et al. | 15—347 X |
| 1,082,356 | 12/13 | Newkirk | 55—304 X |
| 1,286,458 | 12/18 | Warren | 183—71 X |
| 1,325,297 | 12/19 | Kern | 15—347 |
| 1,507,243 | 9/24 | Meyer | 15—340 X |
| 1,733,523 | 10/29 | Birdsall | 183—59 |
| 1,757,834 | 5/30 | Haegler | 55—304 |
| 2,080,154 | 5/37 | Strindberg | 183—71 |
| 2,907,406 | 10/57 | Baden et al. | 183—71 X |
| 2,973,828 | 3/61 | Engle | 183—71 X |
| 3,008,542 | 11/61 | Steele | 15—140 X |

FOREIGN PATENTS

| | | |
|---|---|---|
| 449,912 | 7/36 | Great Britain. |
| 1,170,843 | 9/58 | France. |

WALTER A. SCHEEL, *Primary Examiner.*
CHARLES A. WILLMUTH, *Examiner.*